MULTIPLE SPEED RATIO POWER TRANSMISSION MECHANISM WITH HYDROKINETIC UNIT AND TWO PLANETARY GEAR UNITS

Filed July 1, 1963 2 Sheets-Sheet 1

INVENTOR:
THOMAS R. STOCKTON
BY John G. Faulkner and Donald J. Harrington
ATTORNEYS.

INVENTOR:
THOMAS R. STOCKTON
BY John A. Faulkner
and Donald J. Harrington
ATTORNEYS.

United States Patent Office 3,263,526

Patented August 2, 1966

3,263,526

MULTIPLE SPEED RATIO POWER TRANSMISSION MECHANISM WITH HYDROKINETIC UNIT AND TWO PLANETARY GEAR UNITS

Thomas R. Stockton, Northville, Mich., assignor to Ford Motor Company, Dearborn, Mich., a corporation of Delaware Filed July 1, 1963, Ser. No. 291,802
2 Claims. (Cl. 74—688)

My invention relates generally to improvements in power transmitting mechanisms, and more particularly to a multiple speed ratio power transmission mechanism capable of being used in a driveline for an automotive vehicle wherein provision is made for controlling the relative motion of the torque transmitting elements to produce speed ratio changes with a high degree of smoothness.

According to a preferred embodiment of my invention, I have provided a planetary gear system acting in cooperation with a fluid coupling wherein provision is made for establishing four forward driving speed ratios and wherein the fluid coupling forms a portion of the power delivery path during operation in the two low speed ratios but is rendered ineffective during operation in the two higher speed ratios.

The provision of a transmission mechanism of the type above set forth being a principal object of my invention, it is another object of my invention to provide a transmission having the characteristics set forth above wherein certain speed ratio changes can be accomplished in a nonsynchronous fashion and wherein the other speed ratio changes require simply a timed engagement and release of cooperating friction clutch elements. I contemplate that all of the speed ratio changes can be accomplished without requiring timed engagement or release of a friction brake element.

It is a further object of my invention to provide a power transmission mechanism capable of distributing driving torque from a driving member to each of two transversely disposed axle shafts and which is adapted readily to be used in an automotive vehicle driveline with a minimum amount of space in comparison to a conventional power transmission mechanism having a corresponding number of speed ratios and a corresponding capacity.

Figure 1:
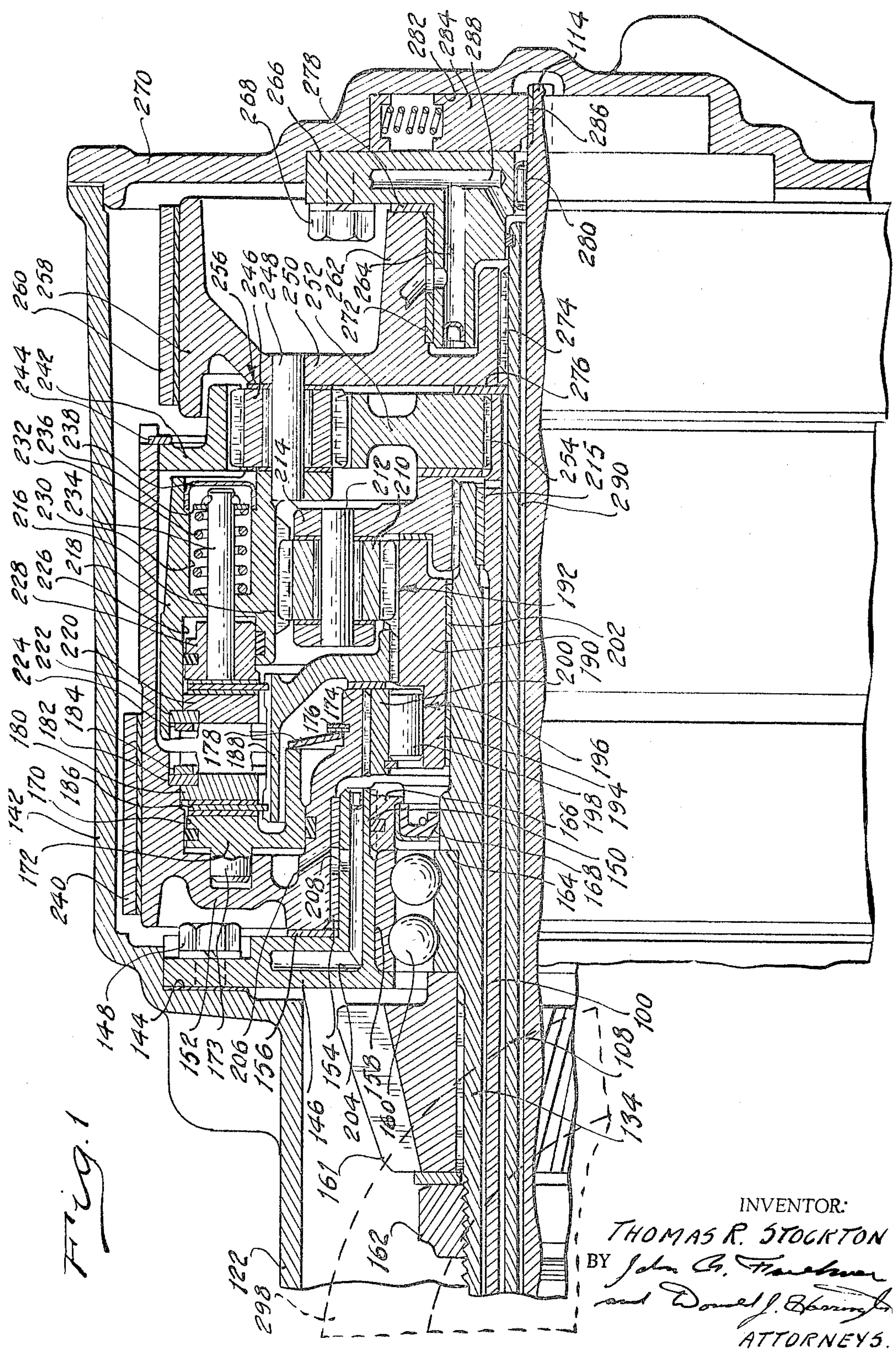
Figure 2:
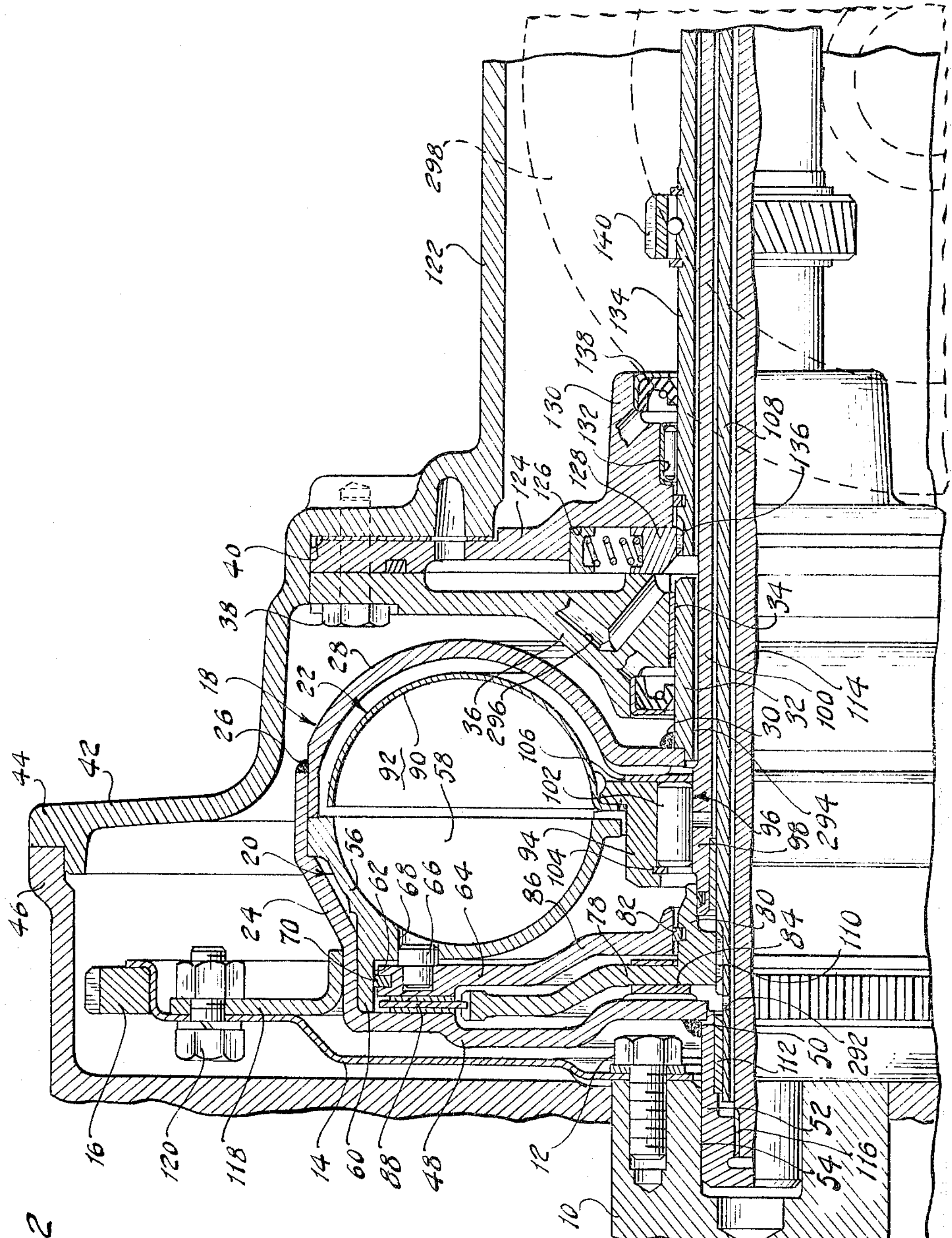

For the purpose of describing more particularly the improvements of my invention, reference will be made to the accompanying drawings wherein FIGURES 1 and 2 show in cross-sectional form an assembly view of a trans-axle transmission component arrangement embodying the features of my invention.

Referring first to FIGURE 2, numeral 10 generally indicates a driving shaft which may be in the form of an engine driven crankshaft for an internal combustion vehicle engine. It is bolted as shown at 12 to the inner periphery of a drive plate 14, the outer periphery of which carries a starter ring gear 16 for the engine.

A fluid coupling is generally indicated by reference character 18. It includes an impeller 20 and a turbine 22. The impeller 20 comprises an impeller shell having a first part 24 which is welded at 26 to a second part 28. The part 28 is formed with a generally toroidal shape to conform to the shape of the turbine 22. The inner periphery of part 28 is welded at 30 to an impeller support sleeve shaft 32 which is journaled by a bushing 34 within a cooperating opening formed in a transverse wall 36.

The wall 36 is secured by bolts 38 at its periphery to a shoulder 40 formed on an impeller housing 42. Housing 42 in turn is secured at its periphery 44 to a housing portion 46 which in turn may be bolted to the engine block of a vehicle engine.

Shell part 24 includes a radially extending portion 48 which is secured by welding 50 to a pilot sleeve shaft 52. This shaft in turn is piloted within an opening 54 formed in the end of crankshaft 10.

Secured to the interior of shell part 24 is an impeller shroud 56. Impeller blades 58 are disposed in circumferentially spaced fashion within the shroud 56 to define radial outflow passages. Shroud 50 includes an annular extension 60 which defines in part an annular cylinder 62. Disposed slidably within the cylinder 62 is a clutch piston 64 having a pilot portion 66 received through a cooperating circular opening 68 formed in the shroud 56. This holds the piston 64 rotatably fast with respect to the impeller although axial movement of the piston 64 with respect to the impeller can be accommodated.

A piston sealing ring 70 surrounds the outer periphery of piston 64.

Situated between piston 64 and portion 48 of shell part 24 is a clutch member 78 having an axially extending hub 80 with a groove that receives a sealing ring 82. A thrust washer 84 is disposed between portion 48 and clutch element 78. Another thrust washer 86 is situated between clutch element 78 and piston 64.

The outer periphery of element 78 is splined to permit a splined driving connection with an internally splined clutch disc 88. Disc 88 is situated between cooperating friction surfaces formed on piston 64 and portion 48.

Turbine 22 includes a shroud 90 having situated therein turbine blades 92 at circumferentially spaced locations. These blades 92 define radial inflow passages that are disposed in toroidal fluid flow relationship with respect to the passages defined by blades 58. Shroud 90 is connected to a turbine hub 94 which also forms an outer race for an overrunning coupling 96. Coupling 96 includes also an inner race 98 that is formed as a part of a torque delivery turbine shaft 100. Disposed between the races of coupling 96 are rollers 102 which cooperate with cammed surfaces formed on the outer race to establish a one-way driving connection between shaft 100 and turbine 22. It is incapable, however, of torque delivery from turbine 22 to the shaft 100 in a reverse drive direction.

Rollers 102 are held axially fast with respect to the outer race by a snap ring 104. A thrust washer 106 is situated between the coupling 96 and the hub of impeller shell part 28.

Shaft 100 extends concentrically through sleeve shaft 32. It surrounds another sleeve shaft 108 which is splined at 110 to clutch element 78. Shaft 108 in turn is piloted by means of a bushing 112 within the shaft 52.

Extending through sleeve shaft 108 is a central shaft 114 which is splined at 116 to the shaft 52, thus connecting the impeller shell and shaft 114 for rotation in unison.

The outer periphery of impeller shell part 24 has connected thereto an annular flange 118 which is bolted by means of bolts 120 to the periphery of drive plate 14.

Situated between housing portion 42 and another housing portion 122 is a pump housing 124 which is bolted by the bolts 38, as shown, to the shoulder 40. Housing 124 defines a pump cavity 126 within which is situated positive displacement pump elements 128.

The wall 36 and the housing 124 cooperate to define the pump cavity as well as the fluid distributor passages for the pump. The pump forms a part of an automatic control valve system which is utilized to control the application and release of friction clutch elements subsequently to be described.

The housing 124 includes an extension 130 within which is formed a bearing opening 132 for receiving a bearing that rotatably supports a power output shaft 134. The power output shaft is splined at 136 to the driving portion of the pump elements 128. A fluid seal 138 is disposed between shaft 134 and the extension 130.

A speedometer drive gear 140 can be provided as indicated on the power output shaft 134 to provide an indication of road speed.

Referring next to FIGURE 1, the housing portion for the gear elements of the mechanism is identified by reference character 142. The housing portions 42, 122 and 142 can be formed as an integral casting if desired. The juncture between housing portions 122 and 142 defines a shoulder 144. A bearing support adaptor 146 is bolted by means of bolts 148 to the shoulder 144. It includes an extension 150 upon which is journaled a drum 152, suitable bushings 154 being provided for this purpose. A thrust washer 156 is situated between the drum 152 and the adjacent surface of the adaptor 146.

Adaptor 146 defines a bearing opening 158 within which is disposed a double ball bearing 160. This bearing journals the power output shaft 134 as indicated.

Splined to the power output shaft 134 is a bevel pinion 161 situated within the housing portion 122. It is held axially fast upon shaft 134 by a locking nut 162. The clamping force of the nut 162 is taken upon a reaction shoulder 164 which engages the inner race of the bearing 160. The outer race of the bearing 160 is held axially fast by a retainer nut 166 threadably received within the threaded portion of the bearing opening 158. A fluid seal 168 is provided between the nut 166 and the shaft 134 as indicated.

Drum 152 defines an annular cylinder 170 within which is positioned an annular piston 172. Piston 172 is formed with a pilot pin portion 173 which is received within a cooperating pilot opening formed in the drum 152.

Drum 152 includes an extension 174 which carries snap rings 176. These in turn define a spring seat for a Belleville washer spring 178 which acts upon the piston 172 and urges it in a left-hand direction as indicated in FIGURE 1.

A clutch reaction plate 180 is connected positively by means of keys 182 to the interior of drum 152. It is held axially fast by snap ring 184. Disposed between piston 172 and reaction plate 180 is a clutch disc 186 which is splined to an externally splined clutch member 188. This member in turn is drivably connected by means of a splined connection with a sun gear 190 of a planetary gear unit 192. Connected also to the sun gear 190 is an inner race 194 for an overrunning coupling 196. This coupling includes rollers 198 and a cammed outer race 200, the latter being splined to the extension 174 of the drum 152. The rollers 198 cooperate with the cammed surfaces of the race 200 to establish a one-way connection between sun gear 190 and the drum 152. Relative rotation of the sun gear 190 with respect to the drum in one direction can be accommodated but such rotation in the opposite direction is inhibited.

Sun gear 190 is journaled by means of bushings 202 upon the power output shaft 134.

The piston 172 and the cylinder 170 cooperate to define a pressure cavity which is in fluid communication with a pressure feed passage 204 formed in adaptor 146, the passage 204 forming a part of the automatic control valve system. This communication is established by a passage 206 formed in the hub of drum 152 and a cooperating port 208 formed in the extension 150. Sun gear 190 meshes with planet pinion gears 210 supported upon pinion shafts 212 which in turn are carried by a planetary carrier 214. Pinion gears 210 mesh also with a ring gear 216. This ring gear is formed on a clutch member 218 which surrounds the gear unit 192. A clutch reaction plate 220 is keyed as shown at 222 to the clutch member 218 and is held axially fast by means of a snap ring 224. Clutch member 218 defines also an annular cylinder 226 within which is slidably positioned an annular piston 228. The cylinder and piston cooperate to define a pressure cavity which may be pressurized by the automatic control valve system, the latter including a pressure feed passage communicating with the cylinder 226 for this purpose.

Carrier 214 is splined as shown to power output shaft 134 and thrust washers are disposed on either side thereof. Shaft 134 is end supported by means of a bushing 215 upon shaft 100.

Clutch member 218 defines also a series of circular spring chambers 230, each of which receives a compression spring 232. Piston 228 carries a plurality of shafts 234 which extend axially through an opening that interconnects cylinder 226 with the spring chambers 230. A spring reaction seat 236 is carried upon each shaft 234, each spring 232 being disposed between the base of a chamber 230 and its associated spring seat 236. If desired, the chambers 230 can be closed by closure members 238.

Drum 152 is surrounded by a reaction brake band 240 which may be applied during operation in the first three forward driving speed ratios. A suitable fluid pressure operated servo, not shown, can be provided for this purpose. Drum 152 extends axially as indicated and surrounds the clutch member 218 and the gear unit 192. The extremity of this extension is connected to a ring gear 242, the periphery of which includes projections that are received within cooperating axial recesses formed in the drum 152. The ring gear 242 is held axially fast with respect to the drum 152 by a snap ring 244.

Ring gear 242 meshes with planet pinion gears 246 supported upon pinion shafts 248. These shafts in turn are carried by a carrier 250 which is connected to clutch member 218.

A sun gear 252 meshes with the planet pinion gears 246 and is splined at 254 to the shaft 100.

Sun gear 252, planet pinion gears 246, ring gear 242 and carrier 250 define the elements of a planetary gear unit that is identified generally by reference character 256.

Carrier 250 forms a part of a reverse reaction brake drum 258 about which is positioned a reverse brake band 260. This band can be applied and released by means of a suitable fluid pressure operated servo to anchor carrier 250.

The hub 262 of the carrier 250 is journaled upon a stationary annular extension 264 formed by a bearing adaptor 266. This adaptor in turn is secured by bolts 268 to a transmission housing end plate 270.

Suitable bushings 272 are disposed between hub 262 and the extension 264.

The carrier 250 is splined at 274 to shaft 108. A thrust washer 276 is situated between carrier 250 and the sun gear 252 and another thrust washer 278 is situated between the carrier hub 262 and the adaptor 266.

Shaft 114 is journaled within a cooperating opening formed in the adapted 266 by means of a bearing 280.

End wall 270 defines a pump chamber 282 within which are situated positive displacement pump elements 284. A driving portion of the elements 284 is keyed at 286 to the shaft 114. This pump, like the one previously described, forms a portion of the automatic control valve system. It is connected drivably to the engine. Adaptor 266 is formed with a clutch pressure feed passage 288 which communicates with an annular feed passage 290. This passage in turn extends to the region between clutch member 78 and the radial portion 48 of the impeller shell part 24. This communication is established by means of one or more ports 292 formed in shaft 108. It thus is apparent that pressure distributed through the annular passage 290 will act upon the piston 64 and tend to urge it out of clutching engagement with friction disc 88. This clutch pressure is opposed, however, by the pressure that exists in the torus circuit of the fluid coupling 22. The torus circuit is supplied with pressurized fluid through annular passage 294 defined by the sleeve shafts 100 and 32. Passage 294 in turn communicates with feed passages 296 formed in the wall 36.

The pinion 161 meshes with a bevel ring gear 298 which in turn distributes torque through a suitable differential mechanism to each of two axle shafts situated on an axis that is transverse with respect to the axis of shaft 114. The axle shafts can be connected, in turn, to the vehicle traction wheels through a suitable driveline arrangement.

The transmission structure is capable of providing four forward driving speed ratios and a single reverse speed ratio. To establish the low speed ratio, brake band 240 is applied thereby holding drum 152 stationary. Ring gear 242 then functions as a reaction member.

The engine torque that is delivered to the impeller 20 of the coupling 22 establishes toroidal fluid flow circulation in the coupling and develops a turbine torque. The turbine torque is transmitted through overrunning coupling 96 and through shaft 100 to the sun gear 252. The carrier 250 then is driven in a forward direction at a reduced speed ratio. The carrier torque of carrier 250 is distributed to ring gear 216. Sun gear 190 functions as a reaction member and is held stationary by overrunning coupling 196 which serves as a torque delivery path to the transmission housing, the path including the drum 152 and the brake band 240. The gear unit 192 thus multiplies the torque output of the gear unit 256. The carrier torque of carrier 214 is distributed in a forward driving direction to the power output shaft 134 and to the pinion 161.

To establish intermediate speed ratio operation, it merely is necessary to engage the clutch shown in part at 226 and 228. This establishes a direct connection between sun gear 190 and ring gear 216 thereby causing the gear unit 192 to assume a locked-up condition. The gear unit 256, however, still functions to multiply torque although its output torque is distributed directly to shaft 134 through the gear unit 192 without being multiplied again. In a preferred embodiment of my invention, the speed ratio thus produced may be approximately 2.5 whereas the speed ration produced during low speed ratio operation may be about 4.0. During operation in each of the speed ratios described, the entire engine torque is distributed through the hydrokinetic fluid coupling 22. The speed ratio shift from the low speed ratio to the second speed ratio is accomplished in a nonsynchronous fashion merely by engaging a single friction clutch. Overrunning coupling 196 freewheels during such a ratio shift thereby eliminating the necessity of selectively releasing the friction brake band for the sun gear 190.

To establish third speed ratio operation, brake band 240 remains applied just as it is during operation in the first two speed ratios. The clutch 226 and 228, however, is released and the clutch shown in part at 64 and 48 is applied. This is done by exhausting pressure on the left-hand side of the piston 64 through the path defined in part by annular passage 90. The circuit pressure in fluid coupling 22 thus causes a locked-up condition of the forward clutch and establishes a direct driving connection between the engine crankshaft 10 and shaft 108.

Overrunning coupling 96 is caused to freewheel since engine torque is distributed directly through shaft 108 to the carrier 250. The ring gear 242 continues to be held stationary by the brake band 240. Thus, engine torque is delivered directly through carrier 250 to the ring gear 216, the latter thus functioning as a power input element for the gear unit 192. Sun gear 190 functions as a reaction element and is held stationary by overrunning coupling 196 which forms in part a torque delivery path to the transmission casing. This path is defined also, of course, by the drum 152 and the engaged brake band 240. The carrier 214 and the power output shaft 134 thus are driven at an increased speed ratio. In a preferred embodiment of my invention, this speed ratio may be approximately 1.6.

The shift from the second speed ratio to the third speed ratio is a clutch-to-clutch shift which may be accomplished in a smooth fashion. The shift involves fewer timing problems than a so-called clutch-to-brake shift or a brake-to-clutch shift as in certain conventional multiple speed transmission arrangements.

To establish a fourth speed ratio, it merely is necessary to re-engage the clutch shown in part at 226 and 228. The forward clutch remains applied as it is during third speed ratio operation. The coupling 96 freewheels during operation in both the third speed ratio and the fourth speed ratio. The coupling 196, however, freewheels during second speed ratio operation and fourth speed ratio operation. During operation in both the third speed ratio and the fourth speed ratio, the fluid coupling 22 is rendered ineffective and the torque delivery path is a solid drive. This contributes to over-all operating efficiency. The fluid coupling is available, however, during acceleration from a standing start and also during a downshift from a high speed ratio to a lower speed ratio for acceleration purposes. The presence of the fluid coupling in the torque delivery path provides the necessary cushion under these conditions.

To establish reverse drive operation, reverse brake band 260 is applied thereby anchoring carrier 250. The reverse clutch shown in part at 170 and 172 is applied to establish a direct connection between sun gear 190 and the drum 152. The front clutch is released and turbine torque then is distributed through coupling 96 and through shaft 100 to the sun gear 252. This causes ring gear 242 to rotate in a reverse direction. The clutch shown at 226 and 228 and the sun gear 190 therefore will rotate in unison with the ring gear 242 in a reverse direction. Ring gear 216, of course, is held stationary since it is connected directly to carrier 250 which in turn is anchored, as mentioned previously. Both gear units thus are effective to multiply torque and the carrier 214 functions as a power output element which is driven in a reverse direction. This, of course, causes the bevel pinion 161 to rotate in a reverse direction.

In a preferred embodiment of my invention, the reverse speed ratio may be approximately 4.0.

It thus is apparent that I have provided a multiple speed ratio power transmission mechanism having a wide range of ratios with evenly stepped ratio changes between the two extremes. The elements that define the transmission structure are arranged in a compact fashion to reduce to a minimum the space requirements for any given torque capacity.

Having thus described a preferred embodiment of my invention, what I claim and desire to secure by United States Letters Patent is:

1. In a multiple speed ratio power transmission mechanism for distributing torque from a driving member to a driven member, a pair of planetary gear units, each gear unit comprising a sun gear, a ring gear, planet gears meshing with said sun and ring gears and a carrier rotatably supporting said planet gears, a hydrokinetic unit having an impeller and a turbine disposed in toroidal fluid flow relationship, said impeller being connected drivably to said driving member, an overrunning coupling connection between the turbine member and the sun gear of a first of said gear units, the carrier of said first gear unit being connected to the ring gear of the second unit, the carrier of the second unit being connected to said driven member, first selectively engageable clutch means for drivably connecting the carrier of said first unit to the sun gear of said second unit during operation in a second and a fourth speed ratio, second selectively engageable clutch means for connecting together the ring gear of said first unit and the sun gear of said second unit during reverse drive operation, overrunning brake means for anchoring the sun gear of said second gear unit to establish a driving torque reaction path during operation in a first and a third speed ratio, selectively engageable brake means for anchoring the carrier of said first gear unit during reverse drive operation, a drum rotatably supported by a relatively stationary portion of said mechanism, other selectively engageable brake means for anchoring said drum, said drum enclosing and partly defining a portion of said second selectively engageable clutch means, said drum enclosing also said first gear unit and said first selectively engageable clutch means, and third selectively engageable clutch means for drivably connecting the carrier of said first gear unit to said driving member during operation in a third speed ratio and a fourth speed ratio.

2. In a multiple speed ratio power transmission mechanism for establishing plural torque delivery paths between a driving member and a driven member, a pair of planetary gear units, each gear unit comprising a sun gear, a ring gear, planet gears meshing with sun and ring gears and a carrier rotatably supporting said planet gears, a hydrokinetic fluid coupling comprising a turbine and an impeller disposed in toroidal fluid flow relationship, said impeller being connected to said driving member, an overrunning coupling connection between the turbine and the sun gear of the first of said gear units, first selectively engageable clutch means for connecting said driving member to the carrier of said first planetary gear unit during operation in a third speed ratio and a fourth speed ratio, a drum rotatably supported upon a stationary portion of said mechanism, a selectively engageable brake means for anchoring said drum during operation in a first, a second and a third speed ratio, the ring gear of the first gear unit being connected to said drum, the carrier of the first gear unit being connected to the ring gear of the second gear unit, the carrier of the second gear unit being connected to said driven member, selectively engageable brake means for anchoring the carrier of the first gear unit during reverse drive operation, second selectively engageable clutch means for connecting the sun gear of the second gear unit to said drum during reverse drive operation, third selectively engageable clutch means for connecting together the ring gear of the second gear unit and the sun gear of the second gear unit during operation in a second and a fourth speed ratio, and an overrunning coupling connection between the sun gear of said second gear unit and said drum to establish a torque reaction path for the second gear unit during operation in a first and a third speed ratio, said drum surrounding said second gear unit and said third clutch means including portions that are common to the ring gear of said second gear unit.

References Cited by the Examiner

UNITED STATES PATENTS

| | | | |
|---|---|---|---|
| 2,395,459 | 2/1946 | Carnagua | 74—759 |
| 2,815,684 | 12/1957 | Roche | 74—759 X |
| 2,829,542 | 4/1958 | Swennes | 74—688 |
| 2,890,601 | 6/1959 | Forster | 74—688 |
| 2,970,497 | 2/1961 | Forster | 74—688 |
| 3,000,233 | 9/1961 | Roche | 74—688 |

DAVID J. WILLIAMOWSKY, *Primary Examiner.*

THOMAS C. PERRY, *Examiner.*